Sept. 25, 1945.  J. M. JOHNSTON  2,385,709
HOLDING DEVICE
Filed Nov. 23, 1944
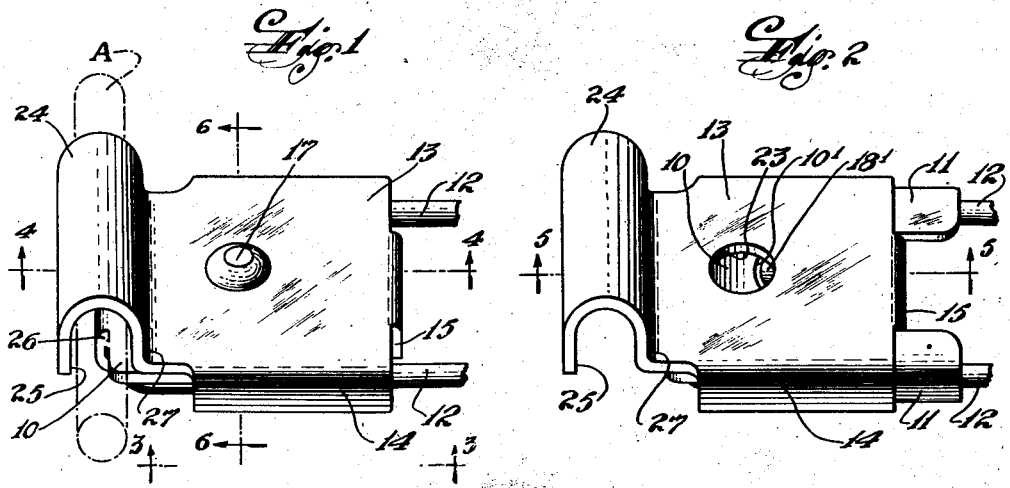
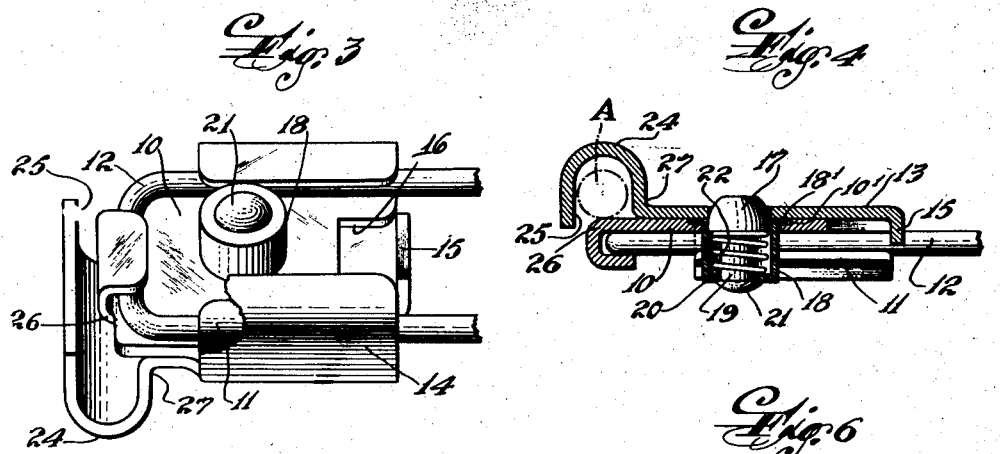
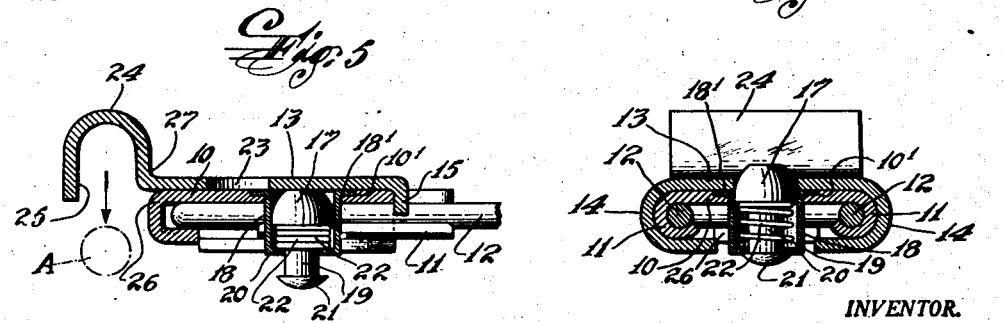
INVENTOR.
J. M. JOHNSTON
BY
ATTORNEY Patented Sept. 25, 1945

2,385,709

UNITED STATES PATENT OFFICE 2,385,709

HOLDING DEVICE

John M. Johnston, Hillside, N. J.

Application November 23, 1944, Serial No. 564,884

7 Claims. (Cl. 24—238)

It is an object of this invention to provide a holding device which is of highly practical construction and operation, which lends itself readily to manufacture at low cost, and is efficient and durable in operation.

A further object of the invention is to provide a device of the character described which is adapted to hold an article positioned therein against displacement, the parts being automatically maintained in that position against displacement and being adapted to be readily shifted into an open position when desired to enable the article held thereby to be readily removed therefrom.

In the drawing:

Fig. 1 is a perspective view of the holding device of my invention in its closed position, Fig. 2 is a similar view of the device in its open position, Fig. 3 is an underplan view of the device taken on line 3—3 of Fig. 1, Fig. 4 is a longitudinal sectional view thereof taken on line 4—4 of Fig. 1, Fig. 5 is a similar view taken on line 5—5 of Fig. 2, and Fig. 6 is a transverse sectional view taken on line 6—6 of Fig. 1.

In the drawing, the device of my invention is shown to comprise a base plate 10 provided with any suitable means, such as longitudinal flanges 11 or the like to secure the device to a handle or other supporting member 12 on which the device is mounted. The drawing illustrates the handle in the form of a wire loop but as will be obvious, the invention is not limited to the utilization of such form of handle but comprehends broadly the mounting of the base plate on any handle, supporting or other mounting member by any securing means.

A slide plate 13 is slidably mounted on the base plate 10, said slide plate being provided with longitudinal flanges 14 or the like for sliding engagement with the base plate, said slide plate being further provided with a depending stud 15 or the like adapted to be received in a recess 16 in the base plate to limit the movement of the slide plate 15 on the base plate in one direction as indicated in Fig. 5.

The base plate 10 is further provided with a tubular housing 18 or the like secured thereto in any convenient or desired manner, as by providing the upper end of said housing with an annular flange 18' received in a circumferential recess 10' in the base plate (see Fig. 4). A ball member 17 is slidably arranged in said housing and is normally urged to project upwardly therefrom by expansion means such as a spring 22 or the like in said housing, said ball member being preferably fixed to a stem 19 or the like projecting through an aperture 20 in the lower end of the housing to guide the ball member in its vertical reciprocation in said housing. The lower end 21 of stem 19 is preferably flattened to define an enlarged head adapted to abut the underside of the housing when the ball member projects to its uppermost position therefrom as shown in Fig. 4.

The slide plate 13 is provided with an aperture 23 or the like, preferably of smaller diameter than the greatest diameter of said ball member, said aperture being in longitudinal alignment with the ball member, whereby, when the plates are in registry as in Fig. 1, the ball member will project partly through said aperture, latching the plates together.

To disengage the plates it is merely necessary to manually or otherwise depress the ball member 17 below the aperture 23 to enable the slide plate 13 to be moved forwardly relative to the base plate so that the aperture 23 of said slide plate will be carried past the ball member 17 and the latter will be compressed in its housing with the stem 19 thereof projecting therefrom, the ball member bearing against the underside of the slide plate 13 with the plates in position of non-registry, as shown in Figs. 2 and 5, until the slide plate is manually or otherwise moved rearwardly to bring the aperture 23 thereof into registry with the ball 17, to cause a renewed latching of the parts and renewed registry of plates 10 and 13 as above described and shown in Fig. 4. The slide plate 13 is provided at the forward end thereof with a keeper flange 24 or similar receiving member for reception of an article A to be held in the latching device, the keeper flange 24 being of generally such cross section as to present an open lower end 25 spaced from the forward edge 27 of the slide plate 13 to present an opening for the reception of the article A to be held in the device.

As will be apparent from an inspection of Fig. 4, when the plates 13 and 10 are in registry, with the ball 17 projecting into the aperture 23, the lower, open end of the keeper flange is partially or substantially closed by the forward edge of the member 26 of the base plate 10, which projects into the plane of said keeper member and substantially closes the same.

As will be apparent from an inspection of Figs. 2 and 5, when the slide plate 13 is slid forwardly on the base plate 10, the lower forward edge of the keeper member 24 is displaced from the forward edge of the base plate 10, so that the keeper member will be open and the article A will readily drop therefrom, or may be readily renewed therefrom. Excessive forward movement of the slide plate 13 is prevented by the engagement of the depending stud 15 with the end of the recess 16 in the base plate as shown in Fig. 5.

It will be understood that the keeper member 24, which is shown in the drawing as being in the form of an arcuate flange, may be formed to define a generally square, angular or other cross section.

While the drawing shows the plates 10 and 13 of flat, relatively thin cross section, they may be of any other desired or convenient cross section within the scope of the invention. Likewise, the parts may be disposed so that member 24 opens downwardly, or, as shown in Fig. 3, so that member 24 opens upwardly, or in any other desired plane or direction.

Having thus described my invention what I claim as new and desire to secure by Letters Patent, is:

1. A holding device comprising a base plate, a ball member and means associated with said base plate to normally urge said ball member upwardly beyond the base plate, a slide plate slidably arranged on said base plate and provided with an aperture of smaller diameter than the greatest diameter of said ball member adapted to receive said ball member to latch the plates together when the plates are in registry and adapted to slide over the base plate when the ball member is depressed below the aperture of said slide plate, and co-acting article retention means carried by the two plates at one end thereof, the article being held by said retention means when the plates are disposed in one position.

2. A holding device comprising a base plate, a ball member and means associated with said base plate to normally urge said ball member upwardly beyond the base plate, a slide plate slidably arranged on said base plate and provided with an aperture of smaller diameter than the greatest diameter of said ball member adapted to receive said ball member to latch the plates together and adapted to slide over the base plate when the ball member is depressed below the aperture of said slide plate, and a keeper member on the forward edge of the slide plate, said keeper member having an opening, said base plate being provided with a forward edge adapted to close said opening when the plates are in registry, with the ball member projecting into the aperture of the slide plate.

3. A holding device comprising a base plate, a housing fixed to said base plate, a ball member disposed in said housing, means to normally urge said ball member upwardly beyond the plate, a slide plate having longitudinal flanges to slidably engage said base plate and provided with means to receive said ball member to latch the plates together, and co-acting article retention means carried by the two plates at one end thereof, the article being held by said retention means when the plates are disposed in one position.

4. A holding device comprising a base plate, a ball member and means associated with said base plate to normally urge said ball member upwardly beyond the base plate, a slide plate slidably arranged on said base plate and provided with an aperture of smaller diameter than the greatest diameter of said ball member adapted to receive said ball member to latch the plates together, and means on said plates to limit the movement of said slide plate on said base plate in one direction, and co-acting article retention means carried by the two plates at one end thereof, the article being held by said retention means when the plates are disposed in one position.

5. A holding device comprising a base plate provided with a recess, a slide plate disposed on said base plate, longitudinal flanges on said slide plate for sliding engagement with the base plate to slidably dispose the slide plate on said base plate, a depending stud on said slide plate adapted to be received in the recess of the base plate to limit movement of the slide plate on the base plate in one direction, a tubular housing, means to secure said housing to said base plate, a member in said housing, means engaging said housing and member to normally urge said member to project from the housing, said slide plate being provided with means to receive and be engaged by said member to latch the plates together, and a keeper flange on the slide plate for reception of the article to be held in the device when the plates are latched together.

6. A holding device comprising a base plate, a slide plate disposed on said base plate, means on said slide plate for sliding engagement with the base plate to slidably dispose the slide plate on said base plate, a tubular housing, means to secure said housing to said base plate, a ball member slidably arranged in said housing, means in said housing engaging said ball member to normally urge said member to project from the housing, said slide plate being provided with means to receive and be engaged by said member to latch the plates together, and a keeper member on the slide plate for reception of the article to be held in the device when the plates are latched together.

7. A holding device comprising a base plate provided with a recess, a slide plate disposed on said base plate, longitudinal flanges on said slide plate for sliding engagement with the base plate to slidably dispose the slide plate on the base plate, means on said slide plate adapted to engage the base plate to limit movement of the slide plate on the base plate in one direction, a tubular housing, means to secure said housing to said base plate, a ball member in said housing, means in said housing engaging said ball member to normally urge said member to project from the housing, said slide plate being provided with means to receive and be engaged by said ball member to latch the plates together when the plates are in registry, and a keeper on the slide plate presenting an open lower end spaced from the forward edge of the slide plate when the plates are out of registry to present an opening for reception of the article and holding said article in the device when the plates are latched together in registry.

JOHN M. JOHNSTON.